US009809254B2

(12) United States Patent
De Leo et al.

(10) Patent No.: US 9,809,254 B2
(45) Date of Patent: Nov. 7, 2017

(54) END STRUCTURE OF A MOTOR VEHICLE BODY

(71) Applicant: FCA Italy S.p.A., Turin (IT)

(72) Inventors: Massimiliano De Leo, Turin (IT);
Saverio Gariano, Turin (IT);
Alessandro Bernardi, Turin (IT);
Gianfranco Del Nero, Turin (IT);
Giuseppe Antonio Soddu, Turin (IT)

(73) Assignee: FCA Italy S.p.A., Torino (IT)

( * ) Notice: Subject to any disclaimer, the term of this patent is extended or adjusted under 35 U.S.C. 154(b) by 19 days.

(21) Appl. No.: 15/153,912

(22) Filed: May 13, 2016

(65) Prior Publication Data
US 2016/0332671 A1 Nov. 17, 2016

(30) Foreign Application Priority Data

May 13, 2015 (IT) .......................... 102015000014925

(51) Int. Cl.
B60J 7/00 (2006.01)
B62D 21/15 (2006.01)
(Continued)

(52) U.S. Cl.
CPC ......... B62D 21/155 (2013.01); B62D 21/152 (2013.01); B62D 27/02 (2013.01); B60R 19/34 (2013.01)

(58) Field of Classification Search
CPC ......... H01L 2924/0002; H01L 2924/00; H01L 23/467; H01L 2224/48091; G06F 1/184;
(Continued)

(56) References Cited

U.S. PATENT DOCUMENTS 6,174,009 B1 * 1/2001 McKeon ................. B60R 19/34
188/377
7,393,030 B2 * 7/2008 Steeg ...................... F16F 7/126
293/120
(Continued)

FOREIGN PATENT DOCUMENTS

DE 19832114 A1 1/2000
DE 102008048678 A1 3/2010

OTHER PUBLICATIONS

Search Report for Italian Application IT UB20150146, 7 pages (3 in Italian) (Jan. 4, 2016).

Primary Examiner — Kiran B Patel
(74) Attorney, Agent, or Firm — Greer, Burns & Crain, LTD

(57) ABSTRACT

An end structure of a motor vehicle body has two longitudinal struts which extend along respective axes have respective ends, on which respective attachment plates are fitted; the attachment plates have respective walls, which are ring-shaped about longitudinal axes and defined frontally by respective faces having substantially vertical and flat resting zones; two supporting plates rest respectively on these resting zones and are fixed to the walls and to two buffering elements, which are substantially coaxial to the struts; the two attachment plates further have respective tabs, which are radiused to said walls at an inner annular perimeter thereof and end with respective edges, which are longitudinally aligned with the supporting plates.

9 Claims, 3 Drawing Sheets

(51) Int. Cl.
  *B62D 27/02*     (2006.01)
  *B60R 19/34*     (2006.01)

(58) Field of Classification Search
  CPC ..... G06F 1/187; Y10T 29/49826; A63H 3/16; B25B 25/00
  USPC ...................................................... 296/187.11
  See application file for complete search history.

(56) References Cited

U.S. PATENT DOCUMENTS

| | | | | |
|---|---|---|---|---|
| 8,276,698 B2* | 10/2012 | Guss | ........................ | B60K 1/04 180/65.1 |
| 2002/0121793 A1* | 9/2002 | Rice | .................... | B60G 99/004 296/35.1 |
| 2006/0249962 A1* | 11/2006 | Gonzalez | ................ | B60R 19/34 293/133 |
| 2007/0176443 A1 | 8/2007 | Yasuhara et al. | | |
| 2008/0169633 A1* | 7/2008 | Gabbianelli | ......... | B23K 33/008 280/781 |
| 2009/0140546 A1* | 6/2009 | Okabe | .................... | B60R 19/18 296/187.09 |
| 2010/0019518 A1* | 1/2010 | Stewart | ................... | B60R 19/34 293/133 |
| 2011/0148151 A1* | 6/2011 | Abe | ........................ | B60R 19/34 296/203.02 |
| 2012/0086225 A1* | 4/2012 | Matsuura | ............ | B62D 21/152 293/132 |
| 2012/0267908 A1* | 10/2012 | Kokubo | .................. | B60R 19/34 293/133 |
| 2014/0183833 A1* | 7/2014 | Takeshita | ............. | B62D 25/082 280/124.109 |
| 2015/0061307 A1* | 3/2015 | Nakanishi | ................ | F16F 7/12 293/133 |
| 2015/0175109 A1* | 6/2015 | Mori | ........................ | B60R 19/34 293/133 |
| 2015/0329144 A1* | 11/2015 | Hara | .................... | B62D 21/152 296/187.09 |
| 2016/0272137 A1* | 9/2016 | Nishimura | .............. | B60R 19/34 |
| 2016/0347374 A1* | 12/2016 | Miyamoto | ........... | B62D 21/152 |
| 2017/0050598 A1* | 2/2017 | Taguchi | .................. | B60R 19/42 |
| 2017/0057440 A1* | 3/2017 | Kitakata | ................ | B60R 19/30 |
| 2017/0057547 A1* | 3/2017 | Taguchi | ................. | B62D 21/11 |
| 2017/0057548 A1* | 3/2017 | Yamada | ............... | B62D 21/152 |

* cited by examiner

END STRUCTURE OF A MOTOR VEHICLE BODY

The present invention relates to an end structure of a motor vehicle body. In particular, the present invention relates to a front end of the body, but the same characteristics can also be understood to apply to a rear end structure.

BACKGROUND OF THE INVENTION

With respect to the front end of a motor vehicle, as is well known, in the engine compartment the body has at least two longitudinal struts, which protrude forward from the passenger compartment at a height substantially equal to that of the front wheel arches, and at their front points support a front end of the vehicle.

This front end comprises a cross-member connected to the struts by means of two buffering elements, which are defined by box elements, generally made of metallic material, which deform plastically to absorb energy in the event of impacts at moderate speed (less than 16 km/h) and are generally known as the "crash-box".

Each strut is equipped with an attachment plate attached, for example by means of bolts, to a supporting plate which in turn is attached to the rear end of the corresponding box buffering element. The attachment plate is fitted around the front point of the strut and has one or more tabs welded to this point. The attachment plate also has a front wall which is substantially vertical and is radiused to such tabs and rests against the support plate of the corresponding buffering element, at a resting plane.

In general, the front edge of each strut is longitudinally spaced, for example by 2-7 mm, from the resting plane of the plates. This value can be different for different vehicles and between the two struts of each vehicle and is specially adjusted by varying the longitudinal position where the two attachment plates are welded, in order to correct tolerances for machining and coupling of the parts of the body that were previously assembled and in order to obtain a perfect orthogonality between the resting plane of the plates and the longitudinal axis of advancement of the vehicle.

In the known solutions, the tabs of the two attachment plates protrude rearwards and terminate longitudinally with respective edges that are welded to the outer lateral surfaces of the struts by means of welding seams.

Solutions of this type are not entirely satisfactory as regards the distribution of the loads on the two attachment plates and the consequent behaviour of the buffering elements during plastic deformation in the event of a frontal impact of the motor vehicle.

In fact, the load due to the collision is transmitted by each buffering element to the corresponding strut at the resting zone between the two plates. This resting zone is annular and is spaced outwardly from the fastening points of the two attachment plates, defined by their tabs and by the aforesaid welding seams. This radial distance defines a lever arm which generates a high bending moment on the front walls of the two attachment plates. Therefore, they tend to bend excessively during impact. An excessive flexural deformation of the mounting plates is undesirable, since it tends to make the actual behaviour of the buffering elements become unstable and therefore unpredictable during their plastic deformation.

Given this uncertainty, the amount of energy actually absorbed by the buffering elements could be less than the projected amount calculated. Therefore, in practice, it is necessary to over-size the buffering elements and also the other elements of the front structure of the body, with a consequent increase in weight.

SUMMARY OF THE INVENTION

The objective of the present invention is therefore to provide an end structure of a motor vehicle body which resolves the drawbacks described above in a simple and economic solution.

According to the present invention, an end structure of a motor vehicle body is achieved as defined in claim 1.

BRIEF DESCRIPTION OF THE DRAWINGS

For a better understanding of the present invention a preferred embodiment is now described, purely as a non-limiting example, with reference to the accompanying drawings, wherein.

DETAILED DESCRIPTION OF THE INVENTION

Figure 1:
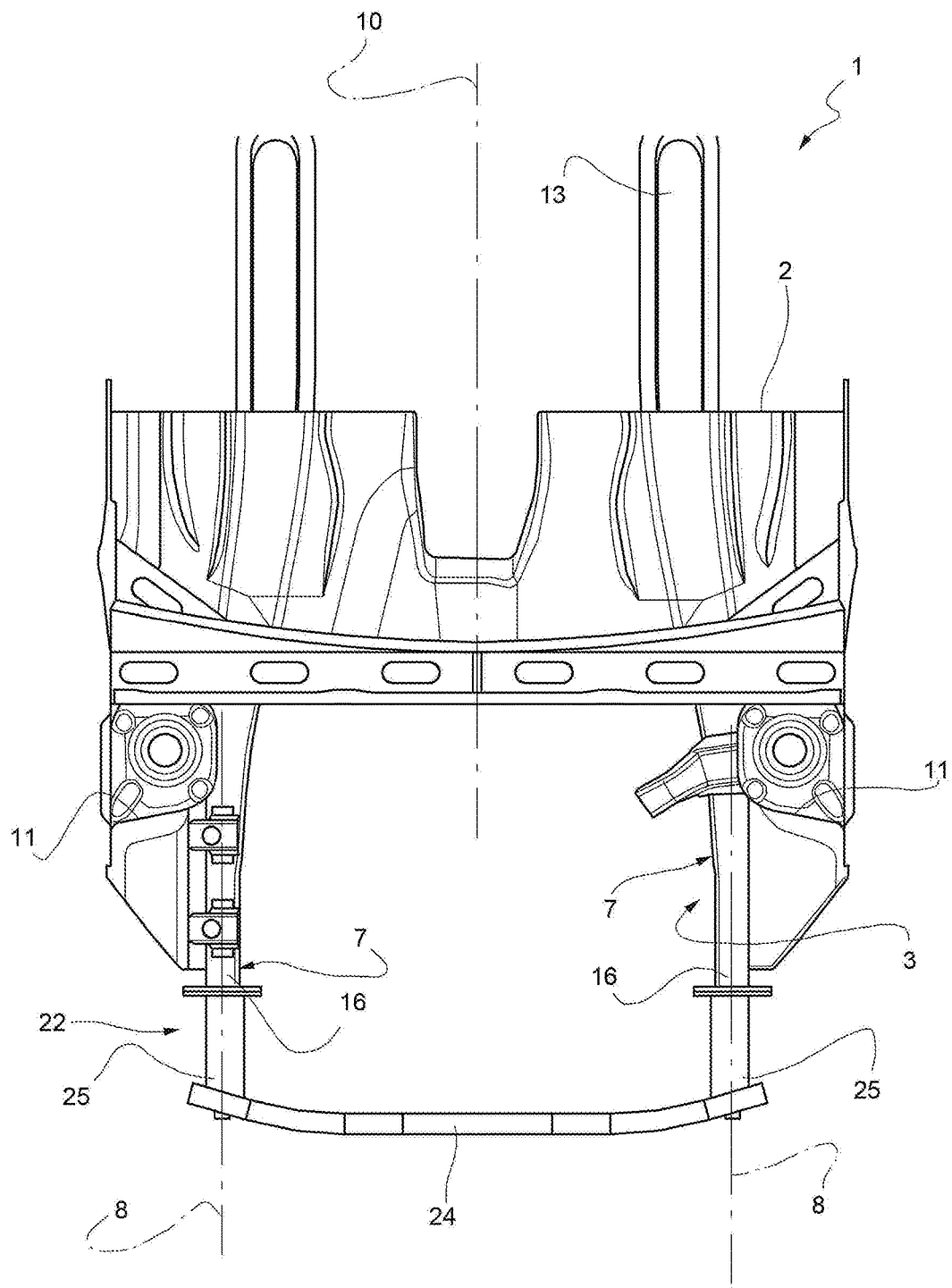
FIG. 1 is a plan view, with parts removed for clarity, of an end structure of a motor vehicle body according to the present invention.

In FIG. 1, the reference number 1 indicates, as a whole, a motor vehicle body (partially shown), comprising a structure 2 defining a passenger compartment and an end structure 3 defining an engine compartment in front of a lower zone of the structure 2. The end structure 3 comprises two longitudinal struts 7, which extend in cantilever manner from the structure 2 along respective axes 8 which are substantially parallel to a longitudinal axis 10 of advancement of the motor vehicle. In particular, the struts 7 are arranged horizontally side by side with the front wheel arches 11 of the motor vehicle and are joined to a floor 13 (partially illustrated) of the structure 2 and protrude forward from a point slightly higher with respect to the floor 13.

The front ends of the struts 7 are indicated by the reference number 16 and support a front end of the vehicle (partially illustrated). This front end comprises a heat-exchanger unit, a front bumper and a frame 22, which forms part of the body 1 and supports the heat-exchanger unit and the bumper in a known and not illustrated manner.

The frame 22 comprises a cross-member 24 and two buffering elements 25, whose front ends are attached to the opposite lateral ends of the cross-member 24. The buffering elements 25 are defined by box elements, generally made of metallic material, are substantially coaxial to the struts 7 along the axes 8, deform plastically to absorb energy in the event of impacts at moderate speed (less than 16 km/h) and are generally known as the "crash-box".

Figure 2:
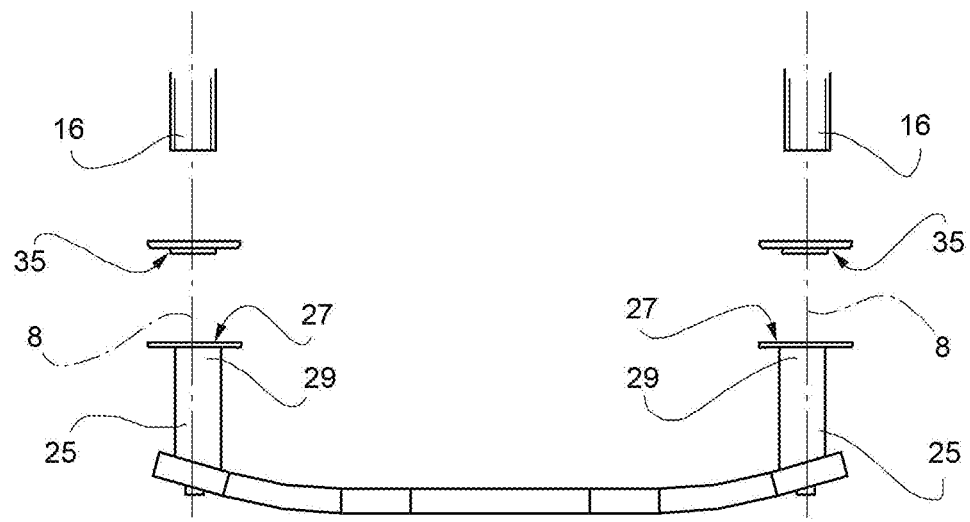
FIG. 2 is similar to FIG. 1 and shows in an exploded view some parts of the structure of FIG. 1.

With reference to FIG. 2, the frame 22 also comprises two supporting plates 27, which are fixed to the rear ends 29 of the buffering elements 25 in a known and not illustrated manner, for example by welding.

Figure 4:
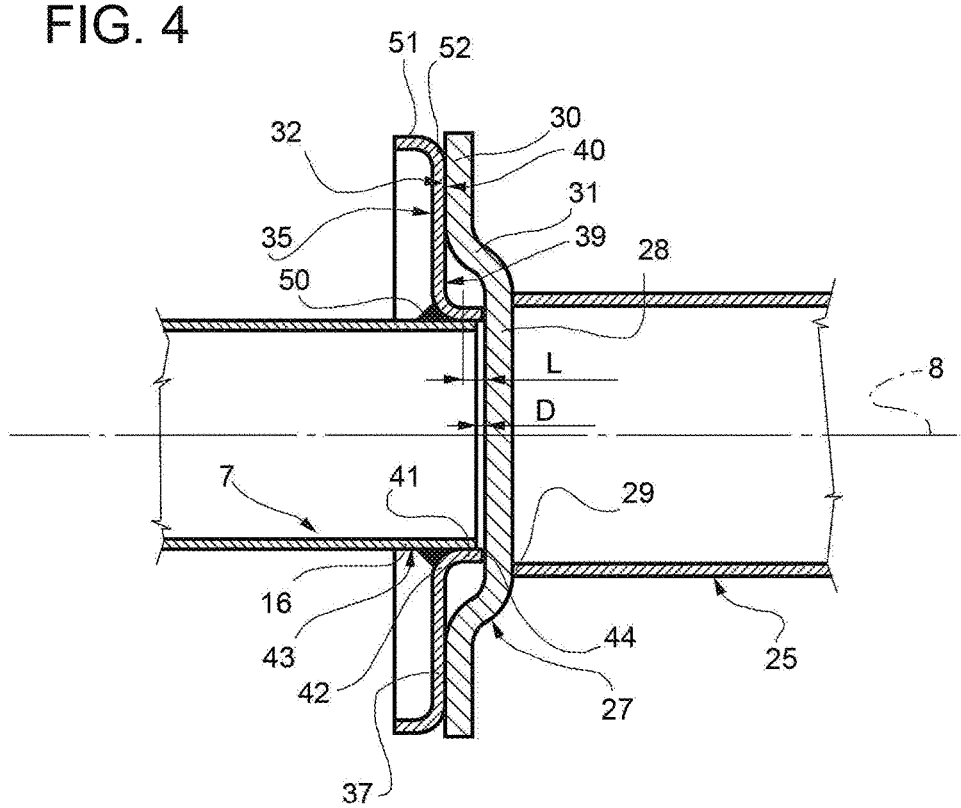
FIG. 4 is a cross section according to the section line IV-IV of FIG. 3 and shows schematically and in enlarged scale a detail of the structure of FIG. 1.

As can be seen in FIG. 4, the supporting plates 27 preferably comprise respective intermediate portions 28, which are arranged axially between the struts 7 and the buffering elements 25 and, preferably, are defined by walls resting axially against the ends 29. The supporting plates 27 also comprise respective peripheral portions 30 having rear surfaces 32, and are substantially vertical and, in a rear view, are ring-shaped about the corresponding axes 8. In the particular example shown, portions 30 are offset longitudinally with respect to the portions 28 to the rear, i.e. towards the struts 7, and are joined to the portions 28 by means of joining portions 31 having a substantially S-shaped cross section.

Figure 5:
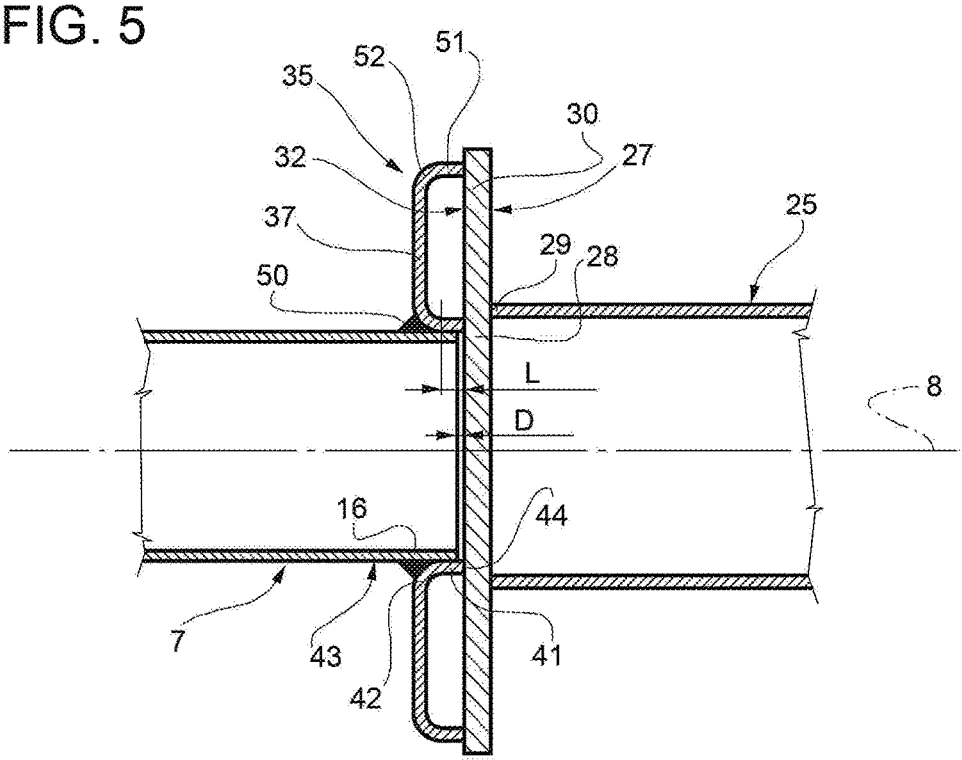
FIG. 5 is similar to FIG. 4 and shows a variant of the structure of the preceding figures.

According to the variant shown in FIG. 5, the supporting plates 27 are flat.

Again with reference to FIG. 4, the supporting plates 27 are connected to the front end 16 of the struts 7 by respective attachment plates 35, which are fitted around the front ends 16 and are attached directly to the latter, preferably by welding as will be better described in the following.

Figure 3:
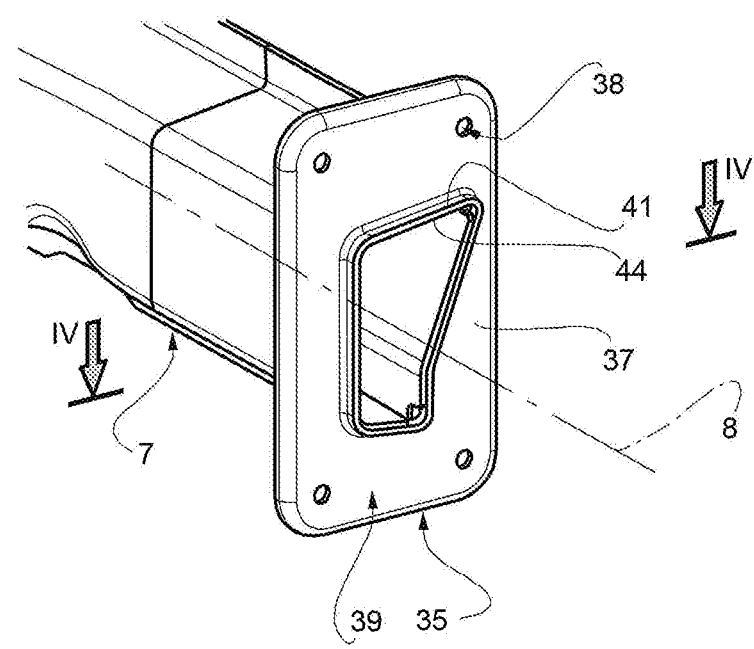
FIG. 3 shows, in perspective view and at an enlarged scale, a component of the structure of FIGS. 1 and 2.

The attachment plates 35 comprise respective walls 37, which are attached to the supporting plates 27. In particular, the fastening is provided by bolts or screws: the walls 37 have a plurality of through holes 38 (FIG. 3), corresponding to an equal number of holes (not shown) made in portions 30 and suitable to be fastened by these screws or bolts.

In particular, the walls 37 in the frontal view are ring-shaped about the corresponding axes 8 and are defined frontally by faces 39 comprising respective flat and substantially vertical resting zones 40. The surfaces 32 rest axially against the resting zones 40 in order to join the supporting plates 27 to the attachment plates 35.

The attachment plates 35 comprise respective tabs 41, which are joined to the walls 37 by means of fillet portions 42 along the inner annular perimeter of these walls 37. Such inner annular perimeter and the profile of the tabs 41 in front view mate with the external perimeter of the ends 16 of the struts 7. In particular, as visible in FIG. 3, the tabs 41 define two collars that are continuous along the inner annular perimeter of the walls 37 and are fitted on the ends 16. In particular, the tabs 41 are orthogonal to the walls 37 and are parallel to and facing respective portions of the outer side surface 43 of the ends 16.

With reference to FIG. 4, according to an aspect of the present invention, the tabs 41 protrude forwards with respect to the walls 37, i.e. towards the portions 28 of the supporting plates 27.

The tabs 41 terminate frontally with respective edges 44 that, according to a preferred embodiment, rest against the portions 28. Alternatively, the edges 44 may be spaced from the portions 28, by a relatively small clearance, for example of approximately 1 mm, so as to remain facing the supporting plates 27 longitudinally.

The tabs 41 protrude longitudinally with respect to the ends 16, for which the edges 44 are spaced longitudinally from the edge of the ends 16 by an amount D, for example of between 0 and 4 mm. This value is generally different for different vehicles and between the two struts 7 of each vehicle and is specially adjusted by varying the longitudinal position where the two attachment plates 35 are actually welded, in order to correct tolerances for machining and coupling of the parts of the body 1 that were previously assembled and in order to obtain a perfect orthogonality between the resting plane defined by the resting zones 40 and the longitudinal axis 10.

Beneficially, an overlap in the radial direction is provided between the tabs 41 and the outer side surface 43, by a length L greater than or equal to 2 mm longitudinally.

As can be seen in FIG. 4, the attachment plates 35 are welded to the outer lateral surfaces 43, in particular by welding seams 50 at the fillet portions 42.

The attachment plates 35 also comprise respective stiffening tabs 51, which are transverse to the walls 37 and joined to them by means of fillet portions 52 along the external annular perimeter of these walls 37.

In the particular example of FIG. 4, the tabs 51 protrude backwards with respect to the walls 37, i.e. in the opposite direction to the supporting plates 27. Therefore, the cross section of each attachment plate 35 comprises two parts which are diametrically opposite with respect to the corresponding strut 7 and are substantially S-shaped.

According to the variant of FIG. 5, the tabs 51 protrude forwards with respect to the walls 37, i.e. towards the supporting plates 27, for which the cross section of each attachment plate 35 comprises two C-shaped parts. In this case, the rear surfaces 32 abut the edges of the tabs 51.

Preferably, the annular space defined between the tabs 51 and 41 is occupied, at least in part, by filling material or additional components (not shown), for example by spacers which are coaxial to the bolts responsible for fastening together the supporting plates and the attachment plates, or by threaded bushings, welded to the tabs themselves and having a height so as to obtain a perfect coupling between the edges 44 and the portions 28.

Beneficially, in the cases of both FIGS. 4 and 5, the stiffening tabs 51 define two collars that are continuous along the external annular perimeter of the walls 37.

In the event of a frontal impact of the motor vehicle the attachment plates 35 provide a reaction to the longitudinal load coming from the supporting plates 27. If the impact occurs at relatively high speed, the said load determines a plastic deformation of the buffering elements 25.

As is evident from what has been described above, the longitudinal load is transferred by the buffering elements 25 to the struts 7 mainly at the edges 44, and marginally at the resting zones 40.

If there is a gap between the edges 44 and the supporting plates 27, the transfer of the longitudinal load occurs for a limited time at the resting zones 40, until such time as the clearance is eliminated by an initial deformation of the plates 35 and 27.

In other words, therefore, when the portions 28 abut the edges 44, the tabs 41 act as a point reacting to the thrust of the supporting plate 27.

Since the edges 44 are substantially aligned with the attachment points defined by the welding seams 50, part of the load that is transmitted by the portions 28 onto the edges 44 does not generate any bending moment on the attachment plates 35. Therefore, generally, the walls 37 of the attachment plates 35 are subjected to a smaller bending moment than occurs in the solutions of the prior art. It follows that the flexing of the walls 37 with respect to the tabs 41 is limited, so that the behaviour of the buffering elements 25 during their plastic deformation is more stable and predictable compared to the solutions of the prior art, regardless of the cross section of the struts 7 and of the cross section of the buffering elements 25. It follows that it is possible to use the energy absorbing capacity of the buffering elements 25 in an optimum manner and that it is not necessary to over-size the latter during design, with a consequent saving in weight.

The other characteristics of the attachment plates 35 and of the supporting plates 27 also contribute to achieving a more balanced distribution of the loads acting on the attachment plates 35 and to making the plastic deformation of the buffering elements 25 and the other components more stable.

It is evident then from the foregoing that the end structure 3 described and illustrated can be subject to modifications and variants which do not depart from the protective scope of the present invention as defined in the appended claims.

In particular, the cross section of the struts 7 and buffering elements 25 could be different from that shown by way of example. In addition, the supporting plates 27 could have a different shape from the one proposed by way of example and/or the tabs 51 may be omitted or replaced/supplemented by other stiffening portions.

Finally, the end structure 3 could be used to form the rear part of the body, instead of the front part, in order to respond to a rear impact.

The invention claimed is:

1. An end structure of a motor vehicle body comprising:
    two longitudinal struts, which extend from a passenger compartment along respective axes substantially parallel to a longitudinal axis of advancement of the motor vehicle and comprise respective first ends;
    two attachment plates, which are fitted on, and directly fixed to, said first ends and comprise:
        a) respective walls, which are ring-shaped about said axes and are defined by respective faces having substantially vertical and flat resting zones;
        b) respective tabs, which are joined to said walls at an inner annular perimeter of said walls;
    two supporting plates resting respectively on said resting zones and fixed to said walls;
    two buffering elements, which are substantially coaxial to said struts and comprise respective second ends fixed to said supporting plates;
    wherein said tabs protrude with respect to said walls towards said supporting plates and end with respective edges, which are longitudinally aligned with said supporting plates so as to be subject to compressive load by the thrust of said supporting plates in case of collision.

2. The end structure according to claim 1, wherein said tabs longitudinally protrude with respect to said first ends.

3. The end structure according to claim 2, wherein said edges longitudinally protrude with respect to said first ends by an amount of 0 to 4 mm.

4. The end structure according to claim 1, wherein said edges longitudinally rest against said supporting plates.

5. The end structure according to claim 1, wherein said tabs form two collars, each of which continuously extends along the inner annular perimeter of the corresponding wall.

6. The end structure according to claim 1, wherein each of said tabs radially overlays an outer side surface of the corresponding first end, over a length of at least 2 mm in the longitudinal direction.

7. The end structure according to claim 1, wherein said attachment plates comprise respective fillet portions, which join said tabs to said walls and are welded to outer side surfaces of said first ends.

8. The end structure according to claim 1, wherein said attachment plates comprise respective stiffening tabs, which are joined to said walls along an outer annular perimeter of said walls.

9. The end structure according to claim 8, wherein said stiffening tabs define two collars, each of which is continuous along the outer annular perimeter of the corresponding wall.

* * * * *